United States Patent
Greenidge et al.

(10) Patent No.: US 9,266,061 B2
(45) Date of Patent: Feb. 23, 2016

(54) UTILIZATION OF A PERIDOTITE-TYPE ROCK FOR THE TREATMENT OF CO2 FROM A CO2-EMITTING INDUSTRIAL PLANT

(76) Inventors: Darius Greenidge, Amissville, VA (US); Jean Greenidge, Amissville, VA (US)

(*) Notice: Subject to any disclaimer, the term of this patent is extended or adjusted under 35 U.S.C. 154(b) by 936 days.

(21) Appl. No.: 13/304,776

(22) Filed: Nov. 28, 2011

(65) Prior Publication Data

US 2012/0131973 A1 May 31, 2012

Related U.S. Application Data

(60) Provisional application No. 61/417,311, filed on Nov. 26, 2010.

(30) Foreign Application Priority Data

Jun. 14, 2011 (EP) ..................... 11169716

(51) Int. Cl.
*B01D 50/00* (2006.01)
*B01D 53/62* (2006.01)
(Continued)

(52) U.S. Cl.
CPC ............... *B01D 53/62* (2013.01); *B01D 53/82* (2013.01); *B01J 20/041* (2013.01); *B01J 20/10* (2013.01); *B01J 20/28045* (2013.01);
(Continued)

(58) Field of Classification Search
CPC ... B01D 53/82; B01D 2257/504; B01J 20/10; B01J 20/041; Y02C 10/08
USPC ..................... 422/177, 180, 168; 95/108, 145
See application file for complete search history.

(56) References Cited

U.S. PATENT DOCUMENTS

| 7,410,621 B2* | 8/2008 | Muter et al. ................. 422/180 |
| 2010/0024686 A1* | 2/2010 | Constantz et al. ............. 106/817 |
| 2010/0212495 A1* | 8/2010 | Gadkaree et al. ............... 95/139 |
| 2011/0100216 A1* | 5/2011 | Kozak et al. .................... 95/168 |

FOREIGN PATENT DOCUMENTS

| WO | 2008061305 | 5/2008 |
| WO | 2010135743 | 11/2010 |
| WO | 2011005831 | 1/2011 |

OTHER PUBLICATIONS

Ross, Shannon. "The Origin, Occurrence, Composition and Physical Properties of the Mineral Iddingsite". Proc. U.S. Nat., Mus., 67 1925.
(Continued)

*Primary Examiner* — Tom P Duong
(74) *Attorney, Agent, or Firm* — Sturm & Fix LLP

(57) ABSTRACT

A filter for treating CO2 from a CO2-emitting industrial plant, takes advantage of the fact that peridotite igneous rocks (or material of similar chemical content: basalt, gabbro, dunite, amphibolites, artificially produced Ca, Mg oxides) which are abundant on and close to the Earth's surface, can absorb and contain CO2 gases resultant from industrial activity. This chemical process occurs naturally, but has not been utilized to capture high concentrations of CO2 emitted into the atmosphere. Calcium and magnesium oxides of the peridotite react with CO2 to form stable carbonate minerals. The invention enhances and expedites this natural process for the remediation of industrial pollutants such as CO2 from the oil, gas, coal, cement/concrete and like CO2-emitting industries, and provides a resource for materials in construction (concrete), steel, aviation and agricultural and other industries.

8 Claims, 1 Drawing Sheet

(51) Int. Cl.
    *B01D 53/82* (2006.01)
    *B01J 20/28* (2006.01)
    *B01J 20/04* (2006.01)
    *B01J 20/10* (2006.01)

(52) U.S. Cl.
    CPC .. *B01D 2257/504* (2013.01); *B01D 2258/0233* (2013.01); *B01D 2258/0283* (2013.01); *Y02C 10/04* (2013.01); *Y02C 10/08* (2013.01)

(56) References Cited

OTHER PUBLICATIONS

Biello, David. "Future of Clean Coal Power Tied to (Uncertain) Success of Carbon Capture and Storage", Scientific American, Mar. 14, 2007.

Kelemen, Peter B. and Matter, Jürg. "In situ carbonation of peridotite for CO2 storage", Scientific Blogger, Nov. 6, 2008.

\* cited by examiner

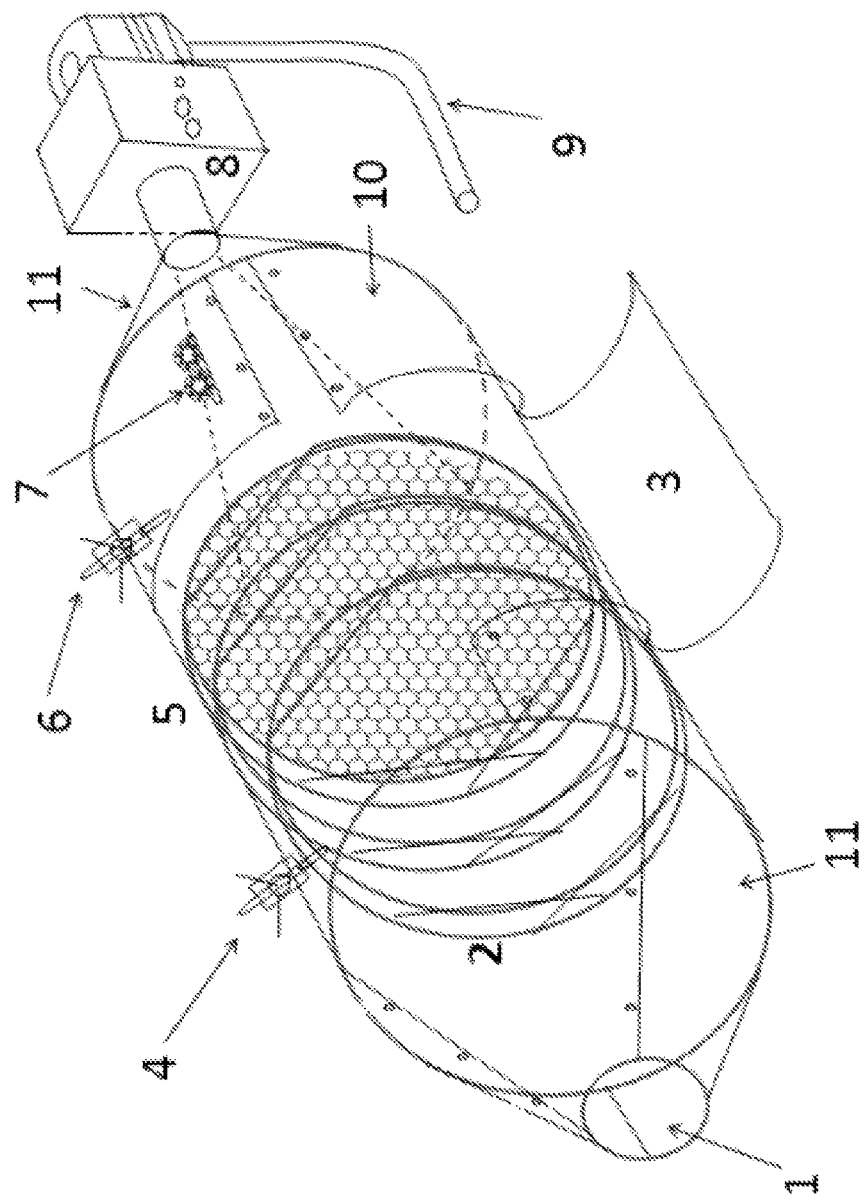

UTILIZATION OF A PERIDOTITE-TYPE ROCK FOR THE TREATMENT OF CO2 FROM A CO2-EMITTING INDUSTRIAL PLANT

CROSS REFERENCE TO RELATED APPLICATIONS

This application claims priority of European Application No. EP11169765 filed Jun. 14, 2011, which claims the benefit of U.S. Provisional Patent Application Ser. No. 61/417,311 filed Nov. 26, 2010 which are incorporated by reference herein in their entirety.

FIELD OF THE INVENTION

This invention relates to the utilization of peridotite-type rock for the treatment of CO2 from a CO2-emitting industrial plant such as in oil or gas refinement or in the coal, cement/concrete industries.

BACKGROUND OF THE INVENTION

Carbon sequestration, or the capture of carbon dioxide gases resultant from an industrial process, has long been known, whereby the gas reacts with available calcium and magnesium oxides to form minerals that are relatively stable, such as in the reaction below[1]:

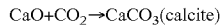

$$CaO + CO_2 \rightarrow CaCO_3 (calcite)$$

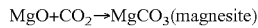

$$MgO + CO_2 \rightarrow MgCO_3 (magnesite)$$

There is an abundance of peridotite ophiolite rocks in certain regions of the world, which are mafic rocks that contain high amounts of such Ca and Mg metal oxides, on and near the surface of the Earth. The surface mineralogy has been known to change when in contact with pollutants such as large amounts of CO2 from oil and gas refineries.

There are numerous propositions to inject CO2 into subterranean saline bedrock (brines), abandoned oil wells, and igneous rock formations in situ, however, the present inventors contend that, short of sending the CO2 deep into the Earth's mantle, about 5 miles (8 km) below the oceanic crust and 20 miles (32 km) below the continental crust, no one can guarantee against leakage due to the very act of injection fracturing of rock with intention to store, allowing for unforeseeable conduits back to the surface. Also, due to natural causes such as infiltration by groundwater (evident in many regions by the dissolution of bedrock carbonates and precipitation as stalagtites and stalagmites in caves), shifting of bedrock by earthquake or human induced "secondary drilling intrusion" (deliberate or unintended release of buried materials/gases by further drilling into bedrock originally intended for perpetual storage), or simple escape of the CO2 by upward permeation trough cracks or porous rock under high pressure due simply to the depth at which such rocks exist. The costs of injection can be expected to be high if there is no return by further oil and gas recovery, and higher electric bills for power sources involved in the recovery would be absorbed by the customer.

It is contended that artificial heating and pressurization would not be enough to speed the reaction of CO2 with peridotite in-situ. However, although there is research under way by various institutions, there is no conclusive experimental evidence that the speed of the reaction cannot be enhanced. There is also no guarantee that the reaction of conversion of CO2 to carbonates would go to completion as required at great depths below the Earth's surface, nor that thereafter, the rocks would be undisturbed by natural or human induced events. Detailed plans exist for the burial of nuclear wastes, but for the same reasons mentioned above, no responsible nation/organization has yet attempted such burial.

Of the billions of tons of CO2 necessary to be sequestered for any significant impact on emissions reduction (25 billion metric tons emitted worldwide in 2003)[2], it is claimed by Kelemen et al[3], that peridotite fields are naturally absorbing between 10,000 and 100,000 tons of CO2 per year. The researchers calculate that 2 tons of CO2 can be absorbed per cubic kilometer (2 tons/km³) of peridotite, and say that this can be enhanced by a factor of 100,000. In order to avoid the costs of mining and transporting the peridotite to industrial centers, they explain that in situ injection of CO2 could enhance the process, to absorb about 4 billion tons of CO2 annually, roughly 13 percent of the total sent into the atmosphere[3].

SUMMARY OF THE INVENTION

An objective of the invention is to provide effective CO2 treatment for CO2-emitting industrial plants by making use of the known properties of peridotite rock and similar rocks whose reaction with CO2 can lead to the production of various useful materials.

This invention is a filter for treating CO2 from a CO2-emitting industrial plant that takes advantage of the fact that peridotite igneous rocks (or material of similar chemical content: for example basalt, gabbro, dunite, amphibolites, artificially produced Ca, Mg oxides) which are abundant on and close to the surface of the Earth, can absorb and contain CO2 gases resultant from industrial activity. It has long been known that this chemical process occurs naturally, but it has not been utilized to capture human induced, high concentrations of CO2 emitted into the atmosphere.

In its main aspects, the invention provides an installation and process for treating CO2 from a CO2-emitting industrial plant, comprising a CO2 filter installed in a duct or other chamber through which, in use, a flow of CO2-containing gases from the industrial plant passes and which can operate with or without vacuum.

According to the invention, the CO2 filter comprises slabs or other bodies or pieces, or gravel or another particulate or crushed form, of peridotite mafic igneous rock or a material of similar chemical composition selected from, for example, basalt, gabbro, dunite and amphibolites, or artificially-produced materials based on Ca and Mg oxides of like chemical composition and like properties to the listed naturally-occurring mafic igneous rock materials.

Another aspect of the invention is a CO2 filter comprising a plurality of slabs or slab-like bodies of peridotite mafic igneous rock or a material of similar chemical composition, wherein the slabs are drilled to form a honeycomb structure or other structure of increased surface area for contact with the CO2, and the slab-like bodies comprise particulate or crushed rock contained in a foraminate holder, or wire netting or the like, or in a binder.

A further aspect of the invention is the use as a CO2 filter associated with a CO2-emitting industrial plant, for treating CO2 from the CO2-emitting industrial plant, of slabs or other bodies or pieces, or gravel or another particulate or crushed form, of peridotite mafic igneous rock or a material of similar chemical composition.

DESCRIPTION OF THE INVENTION

It is proposed that peridotite rock, or other rocks with similar chemical content such as basalt, dunites, gabbros, amphibolites, or any artificially produced Ca, Mg oxide material of similar content, be cut into slabs of suitable shape (circular, square, oval etc) in order to fit the central section of a chamber designed to attach to the pre- or post-combustion carbon capture apparatus used in oil and gas refinement or the coal and cement/concrete industries. The chamber can be designed as a vacuum chamber (or non-vacuum flow chamber), so as to draw the CO2 from its moderately pressurized storage chamber, and can additionally be fitted with steam jets (or other catalyst) in order to speed the reaction of the gas with the peridotite metal oxides. Pressures and temperatures should be maintained so as to keep the CO2 in a gaseous state, although increasing both factors so as to form liquid state can be allowed for experimental flexibility (for example, targeting the supercritical phase at 73 atmospheres and 31 degrees C.). In such case, additional features to improve circulation within the chamber, such as fans or spray jets may be attached as accessories.

The CO2 may be passed through the chamber before combustion and mixing with other flue gases, or after separation from such flue gases. In either case, the cost of high compression of CO2 for transport can be minimized or eliminated, as the CO2 will be immediately passed to the chamber of this present invention on site, for the conversion primarily to the carbonate minerals magnesite and calcite. These minerals can then be utilized for the production of concrete, fertilizers and steel furnace liners for which a joint facility for processing such minerals may be established with the oil and gas refinery, cement, coal industries or other CO2 emitting facility. Remaining iron and aluminum oxides can also be exploited for such important industries as steel and aircraft manufacture.

The appropriate slab thickness can be established based on results when calculating various pressure/temperature conditions as the CO2 is passed through the chamber, and a rate of mineralization can also be established. Multiple slabs can be positioned in tandem, in facing relationship one after the other. All slabs are advantageously drilled to a honeycomb structure or other porous structure in order to increase the surface area to come in contact with the CO2 gas. The tailings from the drilled holes can be retrieved and pasted to a paraffin or other resinous material with similar honeycomb structure, in place of the rock slabs, and which can be heated and washed away after the tailings have fully reacted with the CO2 (a gas-permeable binder may be applied if necessary). Or the tailing material may be packed into the voids in the honeycomb/porous fully reacted or as yet to be reacted peridotite-type rock slab (or slab of similar chemical composition), and then included in the tandem construct, thus minimizing waste and maximizing the carbonate mineral production. Any materials that have not reacted or fully reacted with the CO2 can be recycled into the chamber as often as necessary. The rock can alternatively be completely pulverized into gravel with specific grain sizes, also for the purpose of increasing surface area for increased rate of reaction with the CO2 as it is passed through the chamber, and the peridotite gravel can be contained in specially designed "wire netting" casings, or other type of foraminate holder or frame, or supported in a binder, and which would fit in corresponding brace/holders within the chamber.

The CO2 not fully reacting with the slabs/gravel casings can be cycled back into the chamber until the slabs have reached the point of saturation of carbonate mineral formation, after which they are replaced with fresh slabs. The speed of the reaction can be verified by further experiment.

The invention should prove superior to known proposals for in situ bedrock injection storage, for which there is no guarantee that the CO2 will be permanently contained.

The solution according to the invention, besides or in combination with the reduction of the emission of pollutants, converts the gas into safer materials that can be further transformed by nature itself, into products which serve and support present day lifestyles. The use of peridotite rock slabs or similar material in the invention contributes to this aim.

BRIEF DESCRIPTION OF THE DRAWINGS

The invention will be further described by way of example with reference to the accompanying drawing, the single FIGURE of which (FIG. 1) is a schematic cut-away perspective view of an embodiment of the inventive installation.

DETAILED DESCRIPTION

FIG. 1 schematically shows an installation of the invention, which for example may be up to 10, 20 meters or more or less, in length, and 2.5 m wide, to hold slabs/casings up to 2 meters in diameter cross section and 0.25 m thick. The dimensions can be adjusted according to demand and maximum efficiency dictated by results.

In FIG. 1 the following features are designated by the respective reference signs:
1. Adjustable intake window for $CO_2$ to be loaded into the chamber from initial storage apparatus.
2. Brace/holder for slab of peridotite, designed to hold various cut shapes or gravel casings. Multiple braces can be aligned to hold slabs/casings in tandem.
3. Door for loading/unloading slabs/casings 5.
4. Front steam jet, to be attached to an accessory boiler.
5. Slab of peridotite, having been drilled to honeycomb structure, or gravel casings, up to 2 m in diameter×0.25 m thick (lesser or greater): to hold up to, say, 10 slabs/casings.
6. Rear steam jet, to be attached to accessory boiler.
7. Temperature/pressure gauges.
8. Vacuum (suction) pump, through which the chamber is evacuated and non-reactant CO2 can be channeled to hose (until slabs are completely saturated).
9. Hose line to recycle CO2 to the initial CO2 storage apparatus.
10. Generally cylindrical chamber casing.
11. Generally frusto-conical end piece.

FIG. 1 shows an installation according to the invention for treating CO2 from a CO2-emitting industrial plant, delivered via intake 1 in the frusto-conical end piece 11 into a chamber in the generally cylindrical casing 10 fitted with a CO2 filter installed in the chamber and through which, in use, a flow of CO2-containing gases from the industrial plant passes. As shown in FIG. 1, the described installation receives the flow of CO2-containing gases above ground, for example, from a chimney or the like of the industrial plant, contrary to known underground processes.

In the illustrated embodiment, the CO2 filter is composed of a series of slabs 5 made of peridotite rock or like rock material. The slabs 5, which are of circular shape and drilled to honeycomb structure to increase the surface area in contact with the CO2, are placed in facing relationship one after the other along the chamber by means of a series of braces/holders 2 along the chamber, and are removable and insertable in the chamber via doors 3.

The flow of CO2 is induced by vacuum from the pump 8 which may be shut off during reaction time or other stages of operation.

The supply of CO2 should be shut off for removal and replacement of materials via doors 3.

The installation can be oriented with the long axis of the casing 10 horizontal or vertical or at any suitable angle.

The front and rear steam jets 4, 6 enable the injection of steam to favourize the reaction, whereas the temperature and pressure in the chamber are monitored by gauges 7. The CO2 is evacuated from the chamber's outlet by suction pump 8 that recycles the CO2 to the inlet 1 via hose 9.

The CO2 filter alternatively comprises slab-like bodies containing rock particles, crushed rock, or tailings obtained by drilling the slabs of rock, held in a foraminate holder, or wire netting or the like, or in a binder.

Tailings from the drilled holes in the slabs 5 can be retrieved and pasted to a paraffin or other resinous material in place of the rock slabs, which can be heated and washed away after the tailings have fully reacted with the CO2. A gas-permeable binder may be applied if necessary. Or the tailing material may be packed into the voids in the honeycomb/porous fully reacted or as yet to be reacted peridotite-type rock slab (or slab of similar chemical composition), and then included in the tandem construct, thus minimizing waste and maximizing the carbonate mineral production.

Reaction of the CO2 with the rock material is or is not promoted by steam, heat and/or increased pressure and/or temperature.

Any materials that have not reacted or fully reacted with the CO2 can be recycled into the chamber as often as necessary.

Although the stated chemical reaction for the production of stable carbonates takes place slowly in the natural environment, it is here proposed that such reaction can be accelerated by artificially increased pressures and temperatures. These measures are incorporated into the construct of the proposed invention, although further experiments can be conducted for comparison of the reaction at atmospheric pressures and temperatures as well. Accessories which require electrical power can be solar (wind or other green energy source) powered, and the efficiency of the invention in helping to resolve the current problem can insure return on investment, outweighing the costs involved in electrical or other fueled power.

The final products to be expected from this process would be calcite, magnesite, aluminum oxides and iddingsite (minor silicate clay mixture with iron oxides and ferrihydrites: approximated as, $MgO*Fe_2O_3*4H_2O$. Elemental percentages: $Fe_2O_3$=62%, $SiO_2$=16%, $H_2O$=14%, and $Al_2O_3$=8%)[1]. Various other byproducts such as serpentines can be expected, which can be eventually reduced to clays.

The present invention is available to launch at a cost that would also provide useful products in the long run. Based on Kelemen's claims, we may theoretically consider up to 200 tons of $CO_2/m^3$ under high pressure (which is likely to diverge greatly from the practical situation). The present invention can approximate several tons of $CO_2/m^3$ using approximately 4 slabs or 4 gravel cassettes of diameter 2 m by thickness 0.25 m, using controlled high pressure/temperature conditions. The length of the inventive installation may be 10 to 20 meters or more (or less) as required. At 1 atmospheric pressure and 25 degrees C., 1 ton of CO2 occupies 556.2 $m^3$. This volume can be reduced with artificially induced higher pressures and temperatures. Also to be considered is that the density of crushed rock (or drilled to porous condition) is less than when solid. Mafic igneous rocks (such as peridotites, dunites, basalts, gabbros) have densities of approximately 3 tons/$m^3$. The amount of CO2 which can be absorbed into this volume will depend upon pressure/temperature conditions. Although the entire world production of $CO_2$ is not expected to be consumed into the peridotite bedrock of a single region, any specified region where peridotites abound (or other similar material), can be utilized to handle the volume of CO2 relative to the industrial centers of the country or region involved.

The invention has commercial potential including the following aspects:

Reduction of atmospheric greenhouse gases (CO2);

Production of concrete, whereby Ca and Mg oxide minerals can be used as gravel, or in the production of cement for CaO, lime. Any $CO_2$ produced in this process can be recycled into the inventive installation for further conversion of the peridotite or similar material, to useable Ca, Mg carbonates, silicates for the same concrete industry.

In the construction industry in the production of concrete, whereby Ca and Mg oxide minerals can be used as gravel, or in the production of cement for CaO, lime. CO2 produced in this process can be recycled into the inventive installation for further conversion of the peridotite or similar material, to useable Ca, Mg carbonates, silicates for the same concrete industry.

Agricultural fertilizers: Ca and Mg carbonates used for macronutrients in inorganic fertilizers;

Steel industry (iron oxides removed by magnets);

Aviation industry and others (aluminum oxides).

REFERENCES

1. Ross, Shannon. "The Origin, Occurrence, Composition and Physical Properties of the Mineral Iddingsite". *Proc. U.S. Nat., Mus.*, 67 1925.
2. Biello, David. "Future of "Clean Coal Power Tied to (Uncertain) Success of Carbon Capture and Storage". Scientific American, Mar. 14, 2007.
3. Kelemen, Peter B. and Matter, Jürg. "In situ carbonation of peridotite for CO2 storage", Scientific Blogger, Nov. 6, 2008.

The invention claimed is:

1. An installation for treating CO2 from a CO2-emitting industrial plant, the installation comprising a CO2 filter, a duct or other chamber in which the CO2 filter is installed, the duct or chamber having an inlet which, in use, receives a flow of CO2-containing gases from the industrial plant and an outlet, whereby in use a flow of CO2-containing gases passes through the duct or chamber, through the CO2 filter and out via said outlet wherein the CO2 filter comprises slabs or other bodies or pieces, or gravel or another crushed form, of peridotite mafic igneous rock.

2. An installation according to claim 1, wherein the CO2 filter comprises slabs drilled to form a honeycomb or other structure of increased surface area for contact with the CO2.

3. An installation according to claim 1, wherein openings in a honeycomb or other increased-surface area structure contain packed tailings of the rock obtained by drilling the slabs of rock, the packed tailings optionally being held in the drilled holes of the rock slabs, or in a foraminate holder, or wire netting or the like, or in a binder.

4. An installation according to claim 1, wherein the CO2 filter comprises a plurality of slabs and/or of slab-like bodies arranged in a broad face parallel relationship, one after the other along the duct or chamber.

5. An installation according to claim 4, wherein the duct or chamber is located in an enclosure fitted with a door allowing the removal of the slabs or slab-like bodies when needed when the rock is fully or substantially fully reacted with CO2 and the fitting of un-reacted slabs or slab-like bodies in the duct or chamber.

6. An installation according to claim 1, wherein the CO2 filter is equipped with a return pipe for returning any non-reacted CO2 to the inlet of the duct or chamber for recycling the CO2.

7. An installation according to claim 1, comprising at least one nozzle arranged for injecting steam into the duct or chamber.

8. An installation according to claim 1, comprising a solar or wind energy or other electrical power source for powering electrical equipment for driving the installation.

* * * * *